(12) United States Patent
Bauer et al.

(10) Patent No.: US 10,130,104 B2
(45) Date of Patent: Nov. 20, 2018

(54) VARIABLE LENGTH COOKING DIVIDER

(71) Applicant: Justin Bauer, Solon, OH (US)

(72) Inventors: Justin Bauer, Solon, OH (US); Robert Breetz, Solon, OH (US)

( * ) Notice: Subject to any disclaimer, the term of this patent is extended or adjusted under 35 U.S.C. 154(b) by 85 days.

(21) Appl. No.: 15/221,275

(22) Filed: Jul. 27, 2016

(65) Prior Publication Data

US 2018/0027823 A1 Feb. 1, 2018

(51) Int. Cl.
*A21B 3/13* (2006.01)
*A47J 36/00* (2006.01)

(52) U.S. Cl.
CPC ............ *A21B 3/135* (2013.01); *A21B 3/13* (2013.01); *Y10S 220/912* (2013.01)

(58) Field of Classification Search
CPC ...... A47J 37/108; A47J 37/067; A47J 37/049; A47J 27/13; A47J 36/16; A47F 5/005; B65D 25/06; B65D 25/08; Y10S 220/912
USPC .... 220/551, 543, 550, 552, 529, 530, 573.1, 220/575; 410/129, 94; 99/426, 422, 423; 249/158; D7/357; 126/9 B
See application file for complete search history.

(56) References Cited

U.S. PATENT DOCUMENTS

| | | | | |
|---|---|---|---|---|
| 403,683 A * | 5/1889 | Magruder | ............... | B42F 17/02 220/534 |
| 902,904 A * | 11/1908 | Olshaskie | ................ | A21B 3/13 249/157 |
| 1,232,939 A * | 7/1917 | Lively | ................... | B65D 25/04 220/529 |
| 1,290,186 A * | 1/1919 | Held | ....................... | A47J 36/20 126/9 B |
| 1,297,190 A * | 3/1919 | Lawson | ................. | A47B 88/20 220/551 |
| 1,610,963 A * | 12/1926 | Popper | ..................... | A21B 3/13 220/529 |
| 1,713,328 A * | 5/1929 | Brenner | .................. | A47J 36/20 220/543 |
| 1,836,306 A * | 12/1931 | Brill | ........................ | A21B 3/13 249/142 |
| 2,020,373 A * | 11/1935 | Petzold, Jr. | ............ | A21B 3/133 220/533 |
| 2,148,681 A * | 2/1939 | Cameron | ............. | A01K 41/065 119/322 |
| 2,161,624 A * | 6/1939 | Hoerr | ..................... | A21B 3/135 220/551 |
| 2,496,964 A * | 2/1950 | Steinhauer | .............. | A47J 36/20 220/552 |

(Continued)

*Primary Examiner* — J. Gregory Pickett
*Assistant Examiner* — Gideon Weinerth
(74) *Attorney, Agent, or Firm* — Robert Breetz

(57) ABSTRACT

The variable length baking equipment divider is an invention geared towards maximizing existing baking equipment versatility. The invention is an apparatus used to divide existing cooking equipment into isolated areas to substantially reduce fluid or physical contact for preparing one or more types of food at once. Features of the apparatus are a housing component with a triangular structure; one or more arm components which attach to the housing component. The one or more arm components are configured to expand and retract from the housing component. The base of the housing component and a base of the one or more arm components are effectively in a same horizontal plane so cooking equipment may be effectively partitioned.

16 Claims, 8 Drawing Sheets

(56) References Cited

U.S. PATENT DOCUMENTS

| | | | | |
|---|---|---|---|---|
| 2,658,643 A | * | 11/1953 | Miller | A47J 37/108 |
| | | | | 220/529 |
| 2,663,449 A | * | 12/1953 | Smart | A21B 3/13 |
| | | | | 220/543 |
| 5,074,777 A | * | 12/1991 | Garner | A21B 3/13 |
| | | | | 220/531 |
| 6,357,844 B1 | * | 3/2002 | Muterthies | A47B 96/04 |
| | | | | 220/543 |
| 7,533,864 B1 | * | 5/2009 | Reiser | A21C 5/00 |
| | | | | 249/117 |
| D714,583 S | | 10/2014 | Kwon | |
| 2003/0137227 A1 | * | 7/2003 | Hoenig | A47B 88/90 |
| | | | | 312/348.3 |
| 2009/0255891 A1 | * | 10/2009 | Lanning | A47B 96/04 |
| | | | | 211/183 |
| 2014/0210331 A1 | * | 7/2014 | Tunzi | F25D 25/00 |
| | | | | 312/404 |
| 2015/0069215 A1 | * | 3/2015 | Kohnen | A21B 3/13 |
| | | | | 249/203 |
| 2015/0201802 A1 | * | 7/2015 | Moore | A47J 36/16 |
| | | | | 426/389 |
| 2016/0316969 A1 | * | 11/2016 | White | A47J 37/108 |
| 2017/0320628 A1 | * | 11/2017 | Collier | B65D 25/04 |
| 2018/0027823 A1 | * | 2/2018 | Bauer | A21B 3/135 |
| 2018/0042244 A1 | * | 2/2018 | Barkia | A21B 3/13 |

* cited by examiner

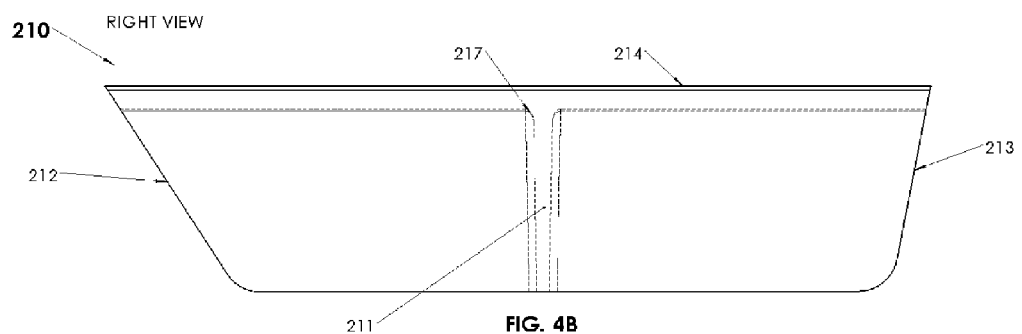
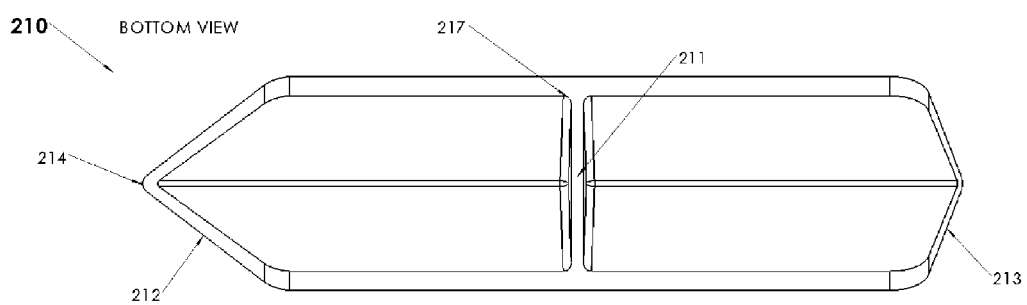
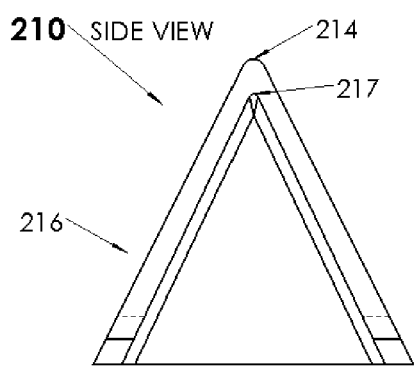

VARIABLE LENGTH COOKING DIVIDER

FIELD

The present disclosure relates to the field of baking or cooking technology, and more specifically for techniques to provide a variable length cooking divider for baking trays.

BACKGROUND

Despite the practice of preparing meals in advanced existing since the creation of the refrigerator, it has yet to be taken to the extreme until recently. In mid-2014, the meal preparation phenomena exploded in popularity amongst bodybuilding communities and on social media platforms. For the first time, influencers in the industry were preparing anywhere from Five to Seven days' worth of food in one cooking session. Considering the ego and competitive nature within the bodybuilding community, social media became a competition platform to showcase how much food could be prepared at once.

Shortly thereafter, meal preparation became a commonly accepted practice within the bodybuilding community. But meal prep did not stop within this community alone; however, it has since expanded to nearly all health and fitness groups, people interested in nutrition and fat loss, and to busy individuals that realized the time saving and health benefit of preparing quality meals in advanced.

This idea behind the Variable Length Baking Tray Divider was coalesced after an extended period of baking single-flavor chicken breasts in large quantities in order to prepare several meals in advanced, and noticing the psychological drawback to consuming the same flavor for consecutive meals. The idea behind the invention was to be able to prepare a large quantity of multi-flavored chicken breasts but it soon became evident that there are several applications for this device.

BRIEF DESCRIPTION OF THE DRAWINGS

FIG. 4B is a right-view projection illustrating the exemplary arm component with hidden lines visible.

FIG. 4C is a bottom-view projection illustrating the exemplary arm component.

FIG. 4D is a side-view projection illustrating the exemplary arm component.

DETAILED DESCRIPTION

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising."

The variable length baking tray divider may be used to create one or more isolated areas on existing baking equipment to greatly minimize physical and fluid contact between different foods while cooking. The detailed description will further describe each feature, starting with FIG. 1A, as purpose of discussion and illustration, and is not limiting with respect to any embodiment or with respect to the claims. The completed assembly may be seen in FIG. 5A and FIG. 5B.

Figure 1A:
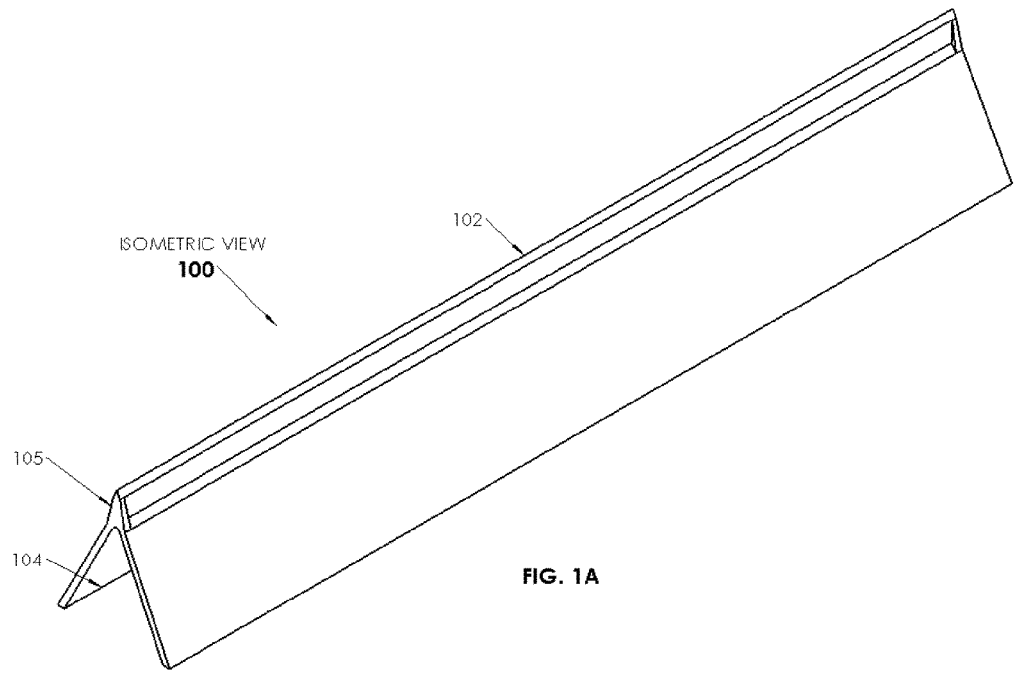
FIG. 1A is an isometric view drawing illustrating an exemplary housing component.

Referring to FIG. 1A, an exemplary housing component 100 is depicted. The housing component 100 comprises many of the features that allow the divider to effectively bisect existing baking equipment. The grip component 102 allows the user to easily interact with the divider in order to place the housing onto baking equipment prior to cooking, or allows the user to remove the housing component 100 for baking, cooking or other operations. In one embodiment, the grip component 102 is designed as a gripping tab with wall geometries that are nearly parallel with another, the gripping tabs and perpendicular to the ground. This structure assists the user in making solid contact with the divider by pinching the grip component 102 in an array of conditions. Said array of conditions comprises in fluid-contact, oily, or dry conditions. In other embodiments the grip component 102 may be circumferential to the housing component 101, or contain additional features for simplified handling.

In one embodiment, the grip support feature 105, provides structural support to the grip component 102. The grip feature 105 may also be beneficial in reducing the likelihood of damage to the housing component 100, and reduce the amount of fatigue experience by the grip component 102. The grip support feature 105 may comprise a tapered and angled design which may substantially increase the life of the manufacturing equipment.

Figure 1B:
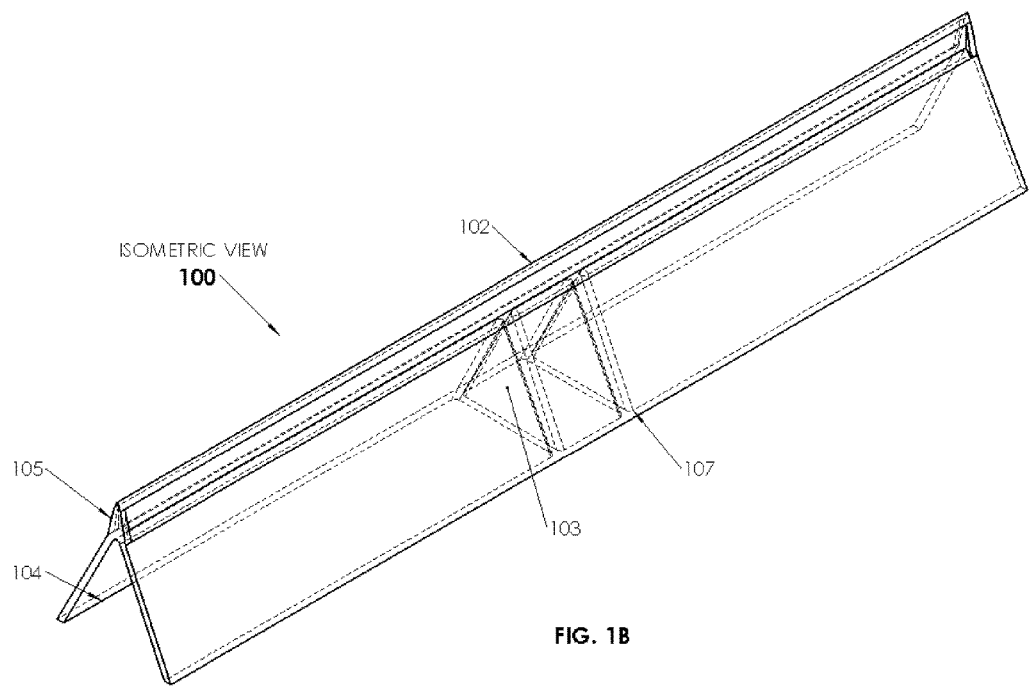
FIG. 1B is an isometric view drawing illustrating the exemplary housing component with hidden lines visible.

Referring to FIG. 1B, the housing component 100 is depicted with hidden lines and internal geometries visible. The housing support 103 comprises two triangular sections which may add structural support to housing component 100. The housing support 103 may assist with preserving the structural integrity of the housing component 100. The housing support 103 may provide the necessary rigidity to maintain quality of the design for room temperature or heated environments. The housing component 103 comprises a plurality of drafted edges, or tapered features, which may extend the life of the manufacturing equipment and reduces material cost, while maintaining the structural integrity of the design.

Referring to FIG. 1B, the housing cavity 104 is within the housing component 100 and may allow for the placement of an arm component 210 at a plurality of varying locations to effectively bisect baking equipment of varying dimensions. The arm component 210 may sit within the housing cavity 104 with a tight tolerance to prevent excess fluid movement between the isolated areas of the baking equipment. In other embodiments the arm component 210 may have loose tolerances to allow for fluid movement between the areas of the baking sheet. The housing cavity 104 is designed to contain the arm component 210 for the sake of simple shipping and storage.

A housing interior rounding 107, displayed in FIG. 1B, is concave rounding of the housing component 100 which prevents an abrupt edge from existing within the structure of the divider by adding a small radius of curvature, which is oftentimes referred to as a chamfer or a filet in design terminology. Through this, the divider may be easily cleaned. The housing interior rounding 107 may provide an additional benefit of distributing potential stress over a broader area and effectively making the divider more durable and capable of bearing larger loads without damage.

Figure 2A:
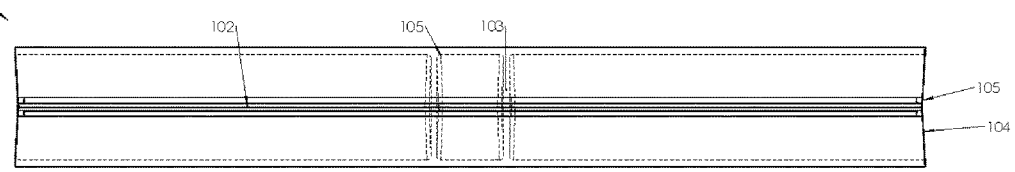
FIG. 2A is a top-view projection illustrating the exemplary housing component with hidden lines visible.
Figure 2B:
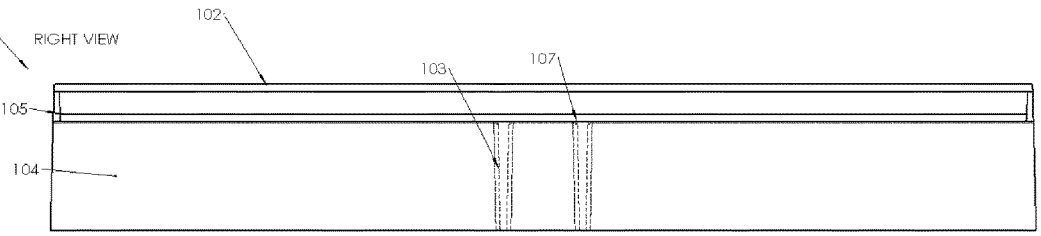
FIG. 2B is a right-view projection illustrating the exemplary housing component with hidden lines visible.
Figure 2C:
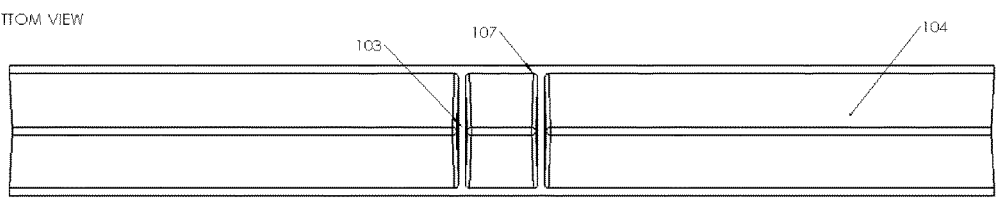
FIG. 2C is a bottom-view projection illustrating the exemplary housing component.
Figure 2D:
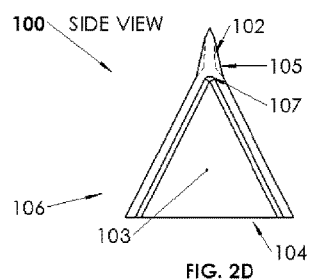
FIG. 2D is a side-view projection illustrating the exemplary housing component.

Referring to FIG. 2D, a housing triangular body 106 shows a tent-shaped or triangular geometry that is used throughout the divider. This feature may increase structural support, and reinforce the ability of the divider to stand freely due to the low center of gravity and favorable moment of inertia.

Figure 3A:
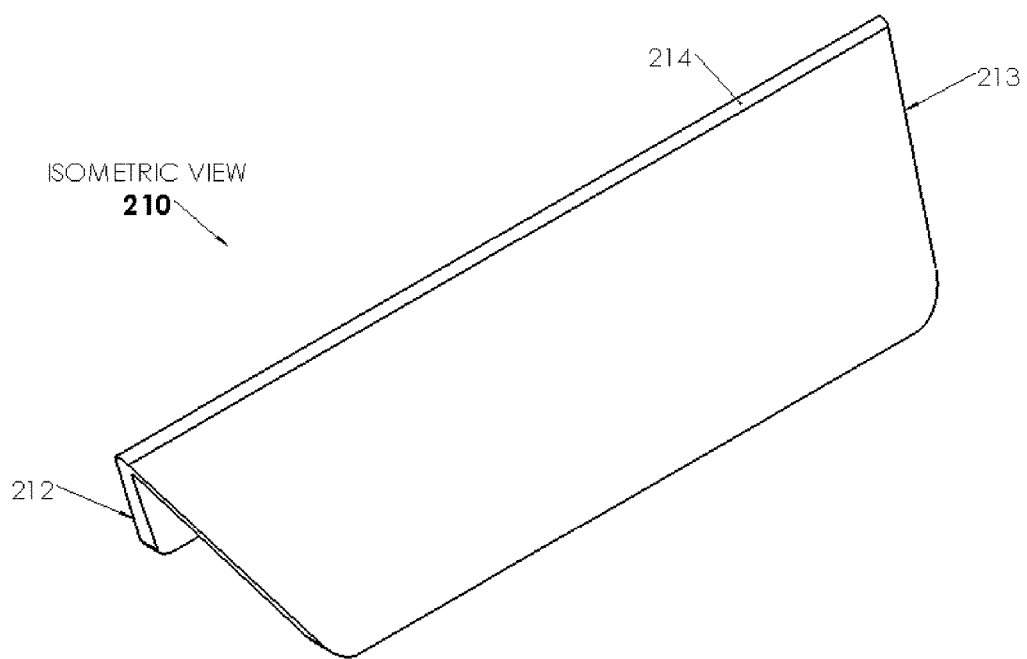
FIG. 3A is an isometric view drawing illustrating an exemplary arm component.

Referring to FIG. 3A, an exemplary arm component 210 is depicted. An arm baking sheet structure 212 may be located at one end of arm component 210, and may make contiguous contact with standard baking sheets. The angled structure of the arm baking sheet structure 212 and a first radius of curvature on the base of the arm component 210 allow for the contiguous contact between the baking sheet, or other baking surface, and the divider. The arm baking pan structure 213 is located at the opposite end of the arm baking sheet structure 212 and comprises a steeper angle and a second, radius of curvature to make close contact with the geometry of baking pans. In another embodiment, the arm component may comprise two arm baking sheet structures or two arm baking pan structures. Additional embodiments include various structures for contiguous contact of cooking equipment outside of baking sheets and baking pans.

Referring to FIG. 3A, the arm exterior rounding 214 is an external convex rounding of arm component 210, and may fit within the geometry of the housing interior rounding 107, as illustrated in FIG. 2D. The fit between the arm exterior rounding 214 and the housing interior rounding 107 may comprise a clearance fit, an interference fit, or a transition fit.

Arm component 210 in FIG. 3A may have a structure to reinforced the contiguous contact of arm baking sheet structure 212 or arm baking pan structure 213. In one embodiment, arm component 210 may have a hook-shaped design when viewed from a right-side perspective. The hook-shaped structure would allow arm component 210 to wrap around the walls of the baking equipment to create a contact. Arm component 210 may also include clips, clamps, or other gripping devices to create contiguous contact with the baking equipment wall. Additional embodiments may include a tension system in which the arm component 210 is pushed into the walls of the baking equipment, through a spring, elastomer, or other resilient technology used for tension or absorption, in order to reinforce the contiguous contact.

Figure 3B:
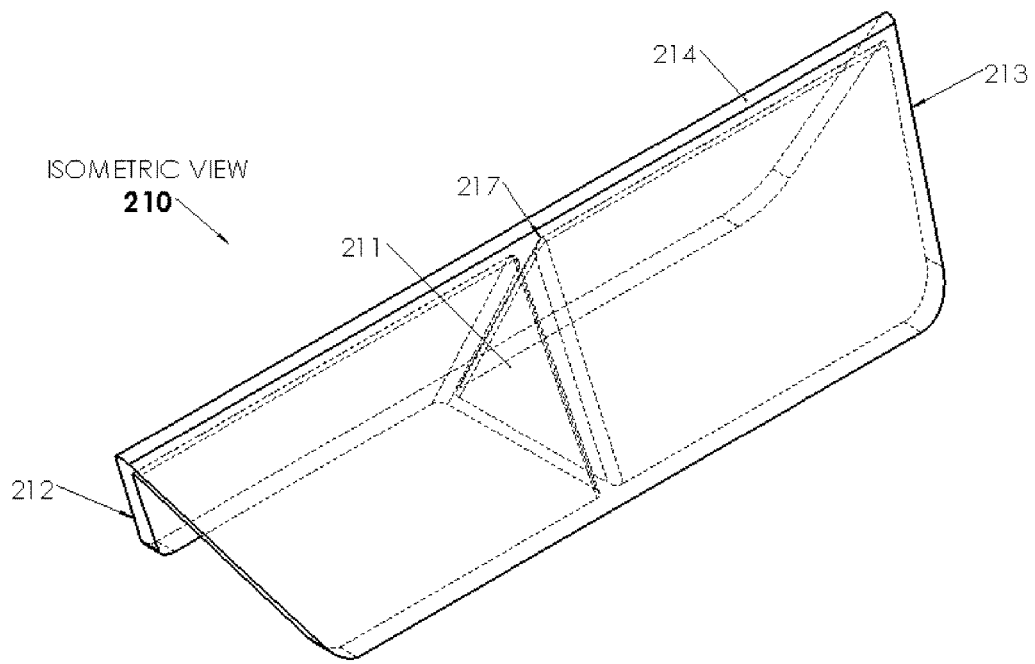
FIG. 3B is an isometric view drawing illustrating the exemplary arm component with hidden lines visible.

An arm structural support 211, illustrated in FIG. 3B, is a structural support which maintains the triangular geometry of the arm component and provides additional structural integrity. Similar to the housing support 103, the arm support 211 features a plurality of drafted edges to increase cycle life of the manufacturing equipment. The arm interior rounding 217 is concave rounding of the arm component 210 and is implemented for the aforementioned benefits as discussed in reference to housing interior rounding 107 feature.

Figure 4A:
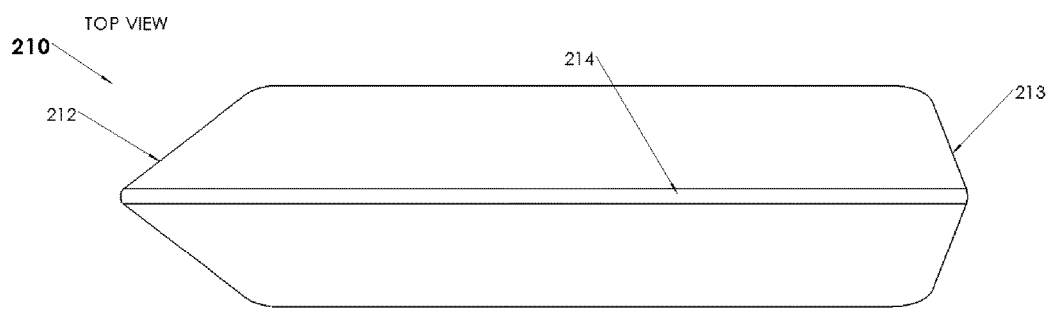
FIG. 4A is a top-view projection illustrating the exemplary arm component.

Referring to FIG. 4D, the triangular body 216 is depicted in the side view of arm component 210. The triangular geometry is utilized for benefits similar to that of housing component 100; Structural support, low center of gravity, and a favorable moment of inertia. Arm baking sheet structure 212 and arm baking pan structure 213 are more evident in FIG. 4B as the two end designs will change in angle relative to a horizontal axis. Additionally, the radius of curvature at the base of the design, where the arm component 210 makes contact with the ground, is different at each end. This allows the arm component 210 to make contiguous contact with standard baking equipment, to compensate for the small rounded portion of baking sheets and baking pans and block excess fluid transfer.

Figure 5A:
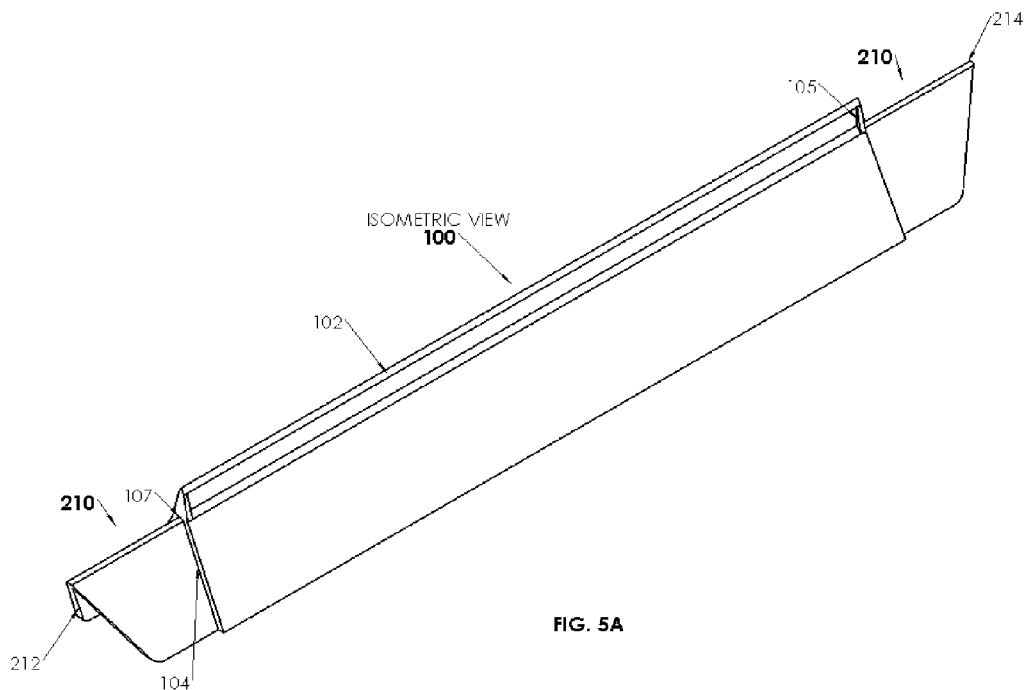
FIG. 5A is an isometric view drawing illustrating an exemplary completed assembly comprising the exemplary housing component and two exemplary arm components.
Figure 5B:
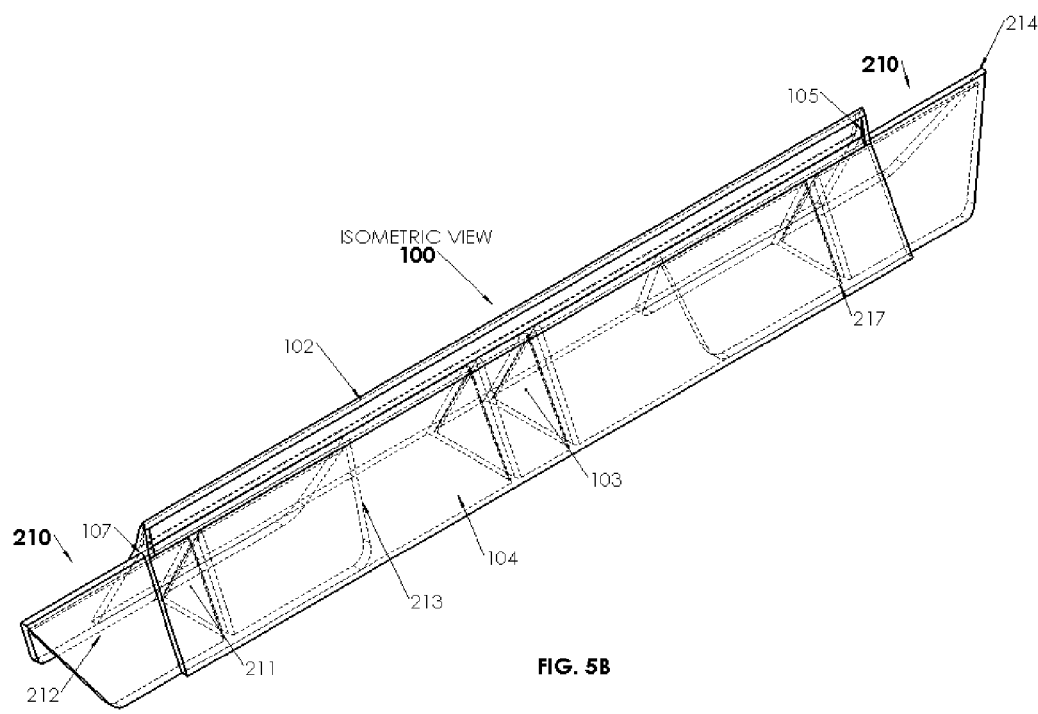
FIG. 5B is an isometric view drawing illustrating the exemplary completed assembly comprising the exemplary housing component and two exemplary arm components with hidden lines visible.

Referring to FIG. 5B, an exemplary completed assembly, consisting of housing component 100 and two instances of arm component 210, is displayed in FIG. 5A and FIG. 5B. The arm component 210 sits within the housing component 100, and may expand or retract to contact or partially contact a wall of the baking equipment to effectively create two or more isolated areas for baking.

In FIG. 5B, arm component 210 is displayed within housing cavity 104, and is intended to display the ability of arm component 210 to telescope in or out of housing cavity 104 that allows the completed assembly to reach various lengths.

In FIG. 5B, the tight tolerances between housing cavity 104 and arm component 210 are observed. The arm exterior rounding 214 matches the geometries of the housing interior rounding 107 of housing component 100. Components are designed with interior or exterior rounded geometries for tight tolerances and to prevent crevasses or areas that are susceptible to food particulate buildup.

Figure 6A:
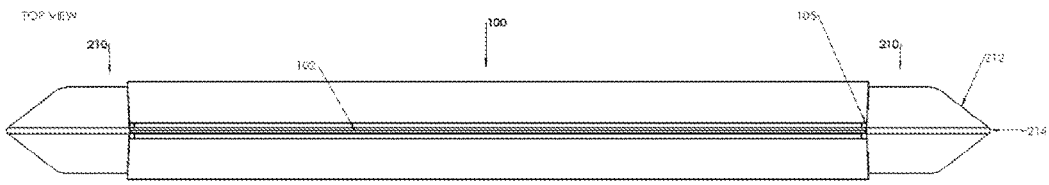
FIG. 6A is a top-view projection illustrating the exemplary completed assembly with hidden lines visible.
Figure 6B:
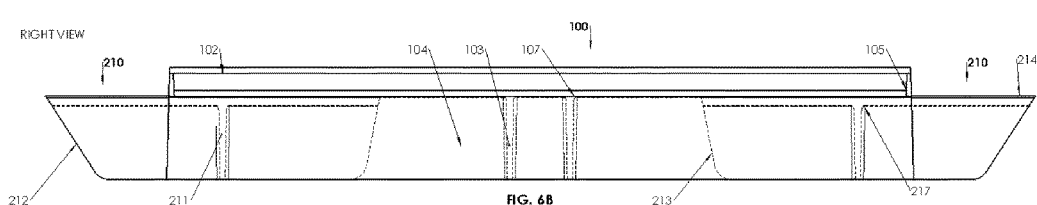
FIG. 6B is a right-view projection illustrating the exemplary completed assembly with hidden lines visible.
Figure 6C:
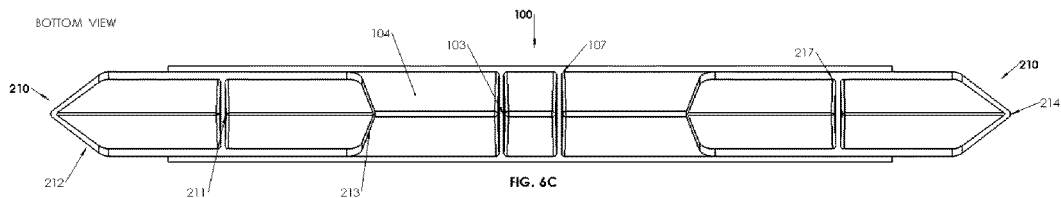
FIG. 6C is a bottom-view projection illustrating the exemplary completed assembly with hidden lines visible.
Figure 6D:
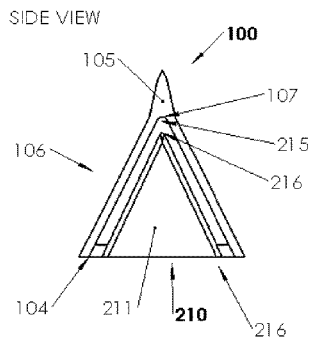
FIG. 6D is a side-view projection illustrating the exemplary completed assembly with hidden lines visible.

Referring to FIG. 6B, the right-view projection of the completed assembly shows two instances of arm component 210 within housing cavity 104. It is noted here that all components sit level with the surface, and the design of arm component 210 completely fills the geometry of the housing cavity 104. This may be advantageous by increasing the friction and surface contact of the components of the completed assembly to prevent unnecessary movement when the divider is placed.

In one embodiment of the invention, the housing component 100 and arm component 210 are comprised of silicone or other inert, synthetic polymer. A silicone-based divider may provide advantages in regards to economical manufacturing cost and simplified compliance with FDA regulations. In another embodiment, the housing and arm components are made of a metal such as aluminum which may provide rigidity of the divider. Further embodiments may include a combination of a synthetic polymer and metal materials. An exemplary embodiment comprising synthetic polymer and metal materials may be used to create a divider that is non-stick, FDA compliant, rigid, and economical to manufacture.

Figure 7A:
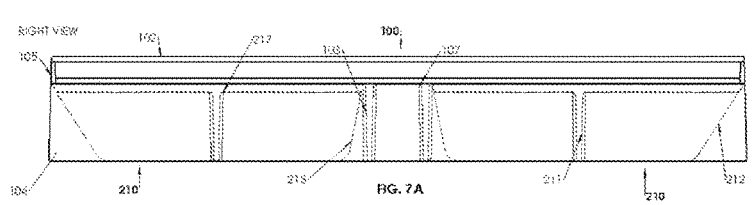
FIG. 7A is a side-view drawing illustrating the exemplary completed assembly with hidden lines visible showing the exemplary two arms in a retracted position.
Figure 7B:
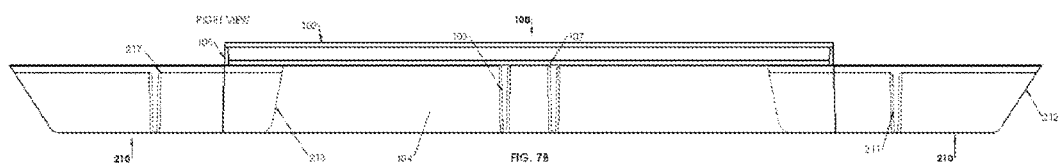
FIG. 7B is a side-view drawing illustrating the exemplary completed assembly with hidden lines visible showing the exemplary two arms in an extended position to bisect a baking sheet.

FIG. 7A and FIG. 7B most clearly display the expanding capabilities of the divider that allows the completed assembly to isolate baking space and make contiguous contact with the baking sheet walls. Arm baking sheet structure 212 is oriented to face away from the housing and allows for adjoining contact of baking sheet walls. FIG. 7A displays the arm component 210 sitting inside of housing cavity 104 in a retracted position. In FIG. 7B, the majority of arm component 210 is exposed, emphasizing expanding feature of arm component 210 changing the overall length of the divider and bisecting baking equipment of varying length.

Figure 8A:
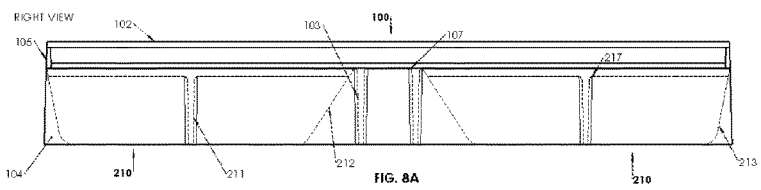
FIG. 8A is a side-view drawing illustrating the exemplary completed assembly with hidden lines visible showing the exemplary two arms in a retracted position.
Figure 8B:
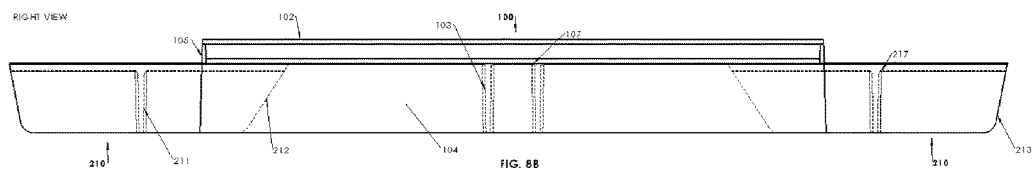
FIG. 8B is a side-view drawing illustrating the exemplary completed assembly with hidden lines visible showing the exemplary two arms in an extended position to bisect a baking pan.

FIG. 8A and FIG. 8B are intended to display similar features as FIG. 7A and FIG. 7B, except the arm component 210 is oriented in a manner to bisect a baking pan by using the arm baking pan structure 213 to make contiguous contact with baking pan walls. Again, expanding feature of arm component 210 is featured in FIG. 8A and FIG. 8B to bisect baking equipment of varying length. The orientation of arm component 210 is determined by the user of the divider and the cooking equipment that will be used.

Various embodiments of the invention have been described herein. These embodiments are given only by a way of example are not intended to limit the scope of the invention. The scope of the invention is not limited to the materials, dimensions, shapes, configurations, etc. described here. The various features of the embodiments may be combined in numerous ways to produce additional embodiments.

For instance, housing component 100, featured in FIG. 5B, may have multiple cavities wherein additional instances of arm components may be placed. One embodiment may include four cavities with telescoping arms, giving the divider a plus-shape, or cross when observed from a top view orientation. Various embodiments may also create more or less isolated cooking areas in several configurations to meet the dimensions of any equipment that requires isolation. Another embodiment may include a fixed-length design. Another embodiment may include a plurality of arm components arranged in a grid geometry.

The embodiments described are not meant to be an exhaustive presentation of the ways in which the invention could be designed. Elements described with respect to one embodiment can be implemented in other embodiments even when not described in such embodiments unless otherwise noted. Although a dependent claim may refer in one or more of the claims, other embodiments can also include a combination of the dependent claim with the subject matter of each other dependent claim or a combination or one or more features with other dependent or independent claims. Furthermore, it is intended also to include features of a claim in any other independent claim even if this claim is not directly made dependent to the independent claim.

For purposes of interpreting the claims for the present invention, it is expressly intended that the provisions of Section 112, sixth paragraph of 35 U.S.C. are not to be invoked unless the specific terms "means for" or "step for" are recited in a claim.

Although the invention has been illustrated and described with respect to one or more implementations, alterations and/or modifications may be made to the illustrated examples without departing from the spirit and scope of the appended claims.

One or more of the operations described can constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, in particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

Example 1 is an apparatus used to divide existing cooking equipment into isolated areas to substantially reduce fluid or physical contact for preparing one or more types of food at once, the apparatus comprising: a housing component comprising a triangular structure; one or more arm components which attach to the housing component; wherein the one or more arm components are configured to expand and retract from the housing component; and wherein a base of the housing component and a base of the one or more arm components are effectively in a same horizontal plane.

Example 2 is the apparatus of example 1, wherein the arm component comprises an arm baking sheet structure on a first side of the arm component and an arm baking pan structure on a second side of the arm component; wherein the arm baking pan structure comprises a steeper angle than an angle of the arm baking sheet structure.

Example 3 is the apparatus of example 1 further comprising: a grip component extending along the housing component, wherein the grip component is perpendicular to a base of the housing component; and a grip support feature to attach the grip component to the housing component.

Example 4 is the apparatus of example 1, wherein the one or more arm components comprise an arm support of triangular geometry.

Example 5 the apparatus of example 1 further comprising: a housing cavity of the housing component wherein the one or more arm components are placed.

Example 6 is the apparatus of example 1, wherein the arm baking sheet structure and the arm baking pan structure comprise one or more radii of curvature, the one or more radii of curvature configured to make contiguous contact with standard baking equipment.

Example 7 is the apparatus of example 1, wherein the one or more arm components and the housing component are made at least partially of silicone or another synthetic polymer.

Example 8 is the apparatus of example 1, wherein the one or more arm components are arranged in a plus-shape.

Example 9 is the apparatus of example 1, wherein the one or more arm components comprise a tension system to push the one or more arm components radially outward from the center of the housing component.

Example 10 is the apparatus of example 1, wherein the one or more arm components comprise a gripping device configured to grasp onto an external structure.

Example 11 is a method to divide existing cooking equipment into isolated areas to substantially reduce fluid or physical contact for preparing one or more types of food at once, the method comprising: providing a housing component comprising a triangular structure; attaching one or more arm components to the housing component; wherein the one or more arm components are configured to expand and retract from the housing component; and wherein a base of the housing component and a base of the one or more arm components are effectively in a same horizontal plane.

Example 12 is the method of example 10, wherein the arm component comprises an arm baking sheet structure on a first side of the arm component and an arm baking pan structure on a second side of the arm component; wherein the arm baking pan structure comprises a steeper angle than an angle of the arm baking sheet structure.

Example 13 is the method of example 10, further comprising: extending a grip component extending along the housing component, perpendicular to a base of the housing component; and attaching the grip component to the housing component with a grip support feature.

Example 14 is the method of example 11, wherein the one or more arm components comprise an arm support of triangular geometry.

Example 15 is the method of example 11 further comprising: placing the one or more arm components in a housing cavity of the housing component.

Example 16 is the method of example 11, wherein the arm baking sheet structure and the arm baking pan structure comprise one or more radii of curvature, the one or more radii of curvature configured to make contiguous contact with standard baking equipment.

Example 17 is the method of example 11, wherein the one or more arm components and the housing component are made at least partially of silicone or another synthetic polymer.

Example 18 is the method of example 11, further comprising: arranging the arm components in a plus-shape.

Example 19 is the method of example 11, wherein the one or more arm components comprise a tension system to push the one or more arm components radially outward from the center of the housing component.

Example 20 is the method of example 11, wherein the one or more arm components comprise a gripping device configured to grasp onto an external structure.

What is claimed is:

1. An apparatus used to divide existing cooking equipment into isolated areas to substantially reduce fluid or physical contact for preparing one or more types of food at once, the apparatus comprising:
   a housing component comprising a triangular structure, a base of the housing component, a first side of the housing component, and a second side of the housing component;
   one or more arm components which attach to the housing component;
   wherein the one or more arm components are configured to expand and retract from the housing component;
   wherein the base of the housing component and a base of the one or more arm components are effectively in a same horizontal plane;
   a grip component extending along the housing component; and
   a tapered drip support feature extending along the housing component to attach the drip component to the housing component.

2. The apparatus of claim 1, wherein the arm component comprises an arm baking sheet structure on a first side of the arm component and an arm baking pan structure on a second side of the arm component; wherein the arm baking pan structure comprises a steeper angle than an angle of the arm baking sheet structure.

3. The apparatus of claim 1, wherein the one or more arm components comprise an arm support of triangular geometry.

4. The apparatus of claim 1 further comprising:
   a housing cavity of the housing component wherein the one or more arm components are placed.

5. The apparatus of claim 1, wherein the arm baking sheet structure and the arm baking pan structure comprise one or more radii of curvature, the one or more radii of curvature configured to make contiguous contact with standard baking equipment.

6. The apparatus of claim 1, wherein the one or more arm components and the housing component are made at least partially of silicone or another synthetic polymer.

7. The apparatus of claim 1, wherein the tapered grip support feature extends from the first side of the housing component to the second side of the housing component.

8. The apparatus of claim 7, wherein the grip component extends from the first side of the housing component to the second side of the housing component.

9. A method to divide existing cooking equipment into isolated areas to substantially reduce fluid or physical contact for preparing one or more types of food at once, the method comprising:
   providing a housing component comprising a triangular structure, a base of the housing component, a first side of the housing component, and a second side of the housing component;
   attaching one or more arm components to the housing component;
   wherein the one or more arm components are configured to expand and retract from the housing component;
   wherein a base of the housing component and a base of the one or more arm components are effectively in a same horizontal plane;

extending a grip component along the housing component; and extending a tapered drip support feature along the housing component to attach the drip component to the housing component.

10. The method of claim 9, wherein the arm component comprises an arm baking sheet structure on a first side of the arm component and an arm baking pan structure on a second side of the arm component; wherein the arm baking pan structure comprises a steeper angle than an angle of the arm baking sheet structure.

11. The method of claim 9, wherein the one or more arm components comprise an arm support of triangular geometry.

12. The method of claim 9 further comprising:
placing the one or more arm components in a housing cavity of the housing component.

13. The method of claim 9, wherein the arm baking sheet structure and the arm baking pan structure comprise one or more radii of curvature, the one or more radii of curvature configured to make contiguous contact with standard baking equipment.

14. The method of claim 9, wherein the one or more arm components and the housing component are made at least partially of silicone or another synthetic polymer.

15. The method of claim 9, wherein the tapered grip support feature extends from the first side of the housing component to the second side of the housing component.

16. The method of claim 15, wherein the grip component extends from the first side of the housing component to the second side of the housing component.

* * * * *